(12) United States Patent
Costain

(10) Patent No.: US 6,783,462 B1
(45) Date of Patent: Aug. 31, 2004

(54) CUE STICK JOINT

(76) Inventor: Paul Costain, 2 Spruce Run, Beverly, MA (US) 01915

( * ) Notice: Subject to any disclaimer, the term of this patent is extended or adjusted under 35 U.S.C. 154(b) by 0 days.

(21) Appl. No.: 10/147,292

(22) Filed: May 15, 2002

(51) Int. Cl.[7] .............................................. A63D 15/08

(52) U.S. Cl. ....................................................... 473/44

(58) Field of Search ................................. 473/288, 306, 473/307, 310, 44–49, 552, 564, 568, 560; 403/297, 306, 307, 314, 292

(56) References Cited

U.S. PATENT DOCUMENTS

| | | |
|---|---|---|
| 248,681 A | 10/1881 | Walter |
| 682,677 A | 9/1901 | Ferchland |
| 965,131 A | 7/1910 | Bliss |
| 970,712 A | 9/1910 | Bloom et al. |
| 3,232,613 A | 2/1966 | Laube, Jr. |
| 3,436,079 A | 4/1969 | Berry et al. ................... 273/68 |
| 4,231,574 A | 11/1980 | Williams ...................... 273/68 |
| 4,340,227 A | 7/1982 | Dopkowski ................... 273/77 |
| 4,565,392 A | 1/1986 | Vyse ............................ 285/23 |
| 4,630,958 A | 12/1986 | McCallister ................ 403/257 |
| 4,645,245 A | 2/1987 | Cunningham ................ 285/321 |
| 5,062,636 A | 11/1991 | Rahn ............................. 273/68 |

(List continued on next page.)

FOREIGN PATENT DOCUMENTS

| | | | |
|---|---|---|---|
| GB | 8849 | of 1885 | |
| GB | 2191707 | 12/1987 | |
| GB | 2192800 A | * 1/1988 | .......... A63D/15/08 |
| GB | 2219946 | 12/1989 | |
| GB | 2226251 | 6/1990 | |
| GB | 2246302 A | 1/1992 | |

OTHER PUBLICATIONS

U.S. patent application, Publication No. US 2002/0022529 A1, Feb. 21, 2002, Bourque.
Drawing of coupling rod manufactured by Bender Cues for securing to one stick portion of a cue stick (Jul. 13, 1992).
Drawing of a prior art cue stick portion having a coupling rod and joint collar (at least by 1985).
Drawing depicting a coupling joint which engages in three revolutions. The smooth elongate tip extending from the external threaded region is not in a close fit with the bore extending from the internal threaded region upon engaging the two threaded regions.
Drawing depicting a coupling joint which has an external threaded region characterized by a significant number of threads. The internal threaded region is characterized by two threads. Extending from the internal threaded region is a smooth bore for receiving the external threaded region. The coupling joint engages in a significant number of revolutions.

*Primary Examiner*—Mark S. Graham
(74) *Attorney, Agent, or Firm*—Hamilton, Brook, Smith & Reynolds, P.C.

(57) ABSTRACT

A joint for a sports stick having first and second stick portions includes a first joint member for securing to the first stick portion. The first joint member includes a coupling rod having a joint securing male threaded region and a centering pin. A second joint member is included for securing to the second stick portion. The second joint member has a cavity for receiving the coupling rod. The receiving cavity includes a joint securing male threaded region, a loose fit inner diameter, and a close fit inner diameter region positioned between the female threaded region and the loose fit inner diameter region. The male threaded region of the coupling rod engages with the female threaded region of the receiving cavity for securing the first and second joint members together and the centering pin closely engages the close fit inner diameter region. The female threaded region and the loose fit inner diameter region are dimensioned with enough clearance relative to the male threaded region and the centering pin of the coupling rod to allow compensation for misalignment.

45 Claims, 4 Drawing Sheets

U.S. PATENT DOCUMENTS

| | | | |
|---|---|---|---|
| 5,334,101 A | 8/1994 | McDermott | 473/44 |
| 5,514,039 A | 5/1996 | Gendron et al. | 473/44 |
| 5,890,966 A * | 4/1999 | Costain et al. | 473/44 |
| 6,027,410 A * | 2/2000 | Costain et al. | 473/44 |
| 6,348,006 B2 | 2/2002 | Costain et al. | 473/44 |
| 6,398,660 B1 * | 6/2002 | Probst et al. | 473/44 |

* cited by examiner

CUE STICK JOINT

BACKGROUND

Many cue sticks have two or sometimes three stick portions which are joined together by joints that allow the assembly or disassembly of the stick portions. Generally, each joint consists of one joint member secured to one stick portion and a mating joint member secured to the adjacent stick portion which, when engaged, couple the stick portions together.

Some cue stick joints include a coupling rod of one joint member secured to one stick portion and a sleeve of the other joint member secured to the other stick portion. The coupling rod has a male threaded region and a centering pin. The sleeve has a bore for receiving the centering pin of the coupling rod to axially align the coupling rod with the sleeve and a female threaded region for engaging with the male threaded region to secure the coupling rod and sleeve together, thereby securing the two stick portions together. A tight fit between the centering pin of the coupling rod and the bore of the sleeve is generally desirable for keeping the coupling rod and sleeve in axial alignment, which in turn keeps the mating stick portions axially aligned. Cue stick portions that are axially aligned are desired for obtaining optimum performance of the cue stick.

When there is a tight fit between the centering pin of the coupling rod and the bore of the sleeve, the coupling rod and the sleeve must be installed within their respective stick portions with precision in order to axially align the coupling rod and sleeve along the axis of the stick portions. If the coupling rod and the sleeve are axially misaligned with their respective stick portions, the coupling rod and sleeve will secure to each other in axial alignment but the stick portions will be axially misaligned with each other. Axial misalignment of the stick portions of a cue stick is not only unsightly but also results in reduced performance of the cue stick.

SUMMARY

The present invention includes a joint for a sports stick that allows for some misalignment between the joint members and the respective stick portions while still enabling the stick portions to be joined together in axial alignment.

The present invention provides a joint for a sports stick having first and second stick portions which includes a first joint member for securing to the first stick portion. The first joint member includes a coupling rod having a joint securing male threaded region and a centering pin. A second joint member is included for securing to the second stick portion. The second joint member has a cavity for receiving the coupling rod. The receiving cavity includes a joint securing female threaded region, a loose fit inner diameter, and a close fit inner diameter region positioned between the female threaded region and the loose fit inner diameter region. The male threaded region of the coupling rod engages with the female threaded region of the receiving cavity for securing the first and second joint members together and the centering pin closely engages the close fit inner diameter region. The female threaded region and the loose fit inner diameter region are dimensioned with enough clearance relative to the male threaded region and the centering pin of the coupling rod to allow compensation for misalignment.

In preferred embodiments, the close fit inner diameter region can have a tapered entrance. The close fit inner diameter region is sufficiently short in axial length, and the clearance of the female threaded region and the loose fit inner diameter region relative to the male threaded region and the centering pin of the coupling rod is sufficiently large to allow pivoting of the coupling rod about the close fit inner diameter region. A grippable insert is positioned within the receiving cavity of the second joint member adjacent to the close fit inner diameter region for gripping the centering pin of the first joint member. The grippable insert is compressible and is often an "O" ring. The first joint member includes a collar encircling the joint securing male threaded of the coupling rod for protecting the male threaded region. The first and second joint members include secondary male threaded regions for securing the first and second joint members to the first and second stick portions, and a smooth outer diameter region with a glue groove adjacent to the secondary male threaded regions for securement within alignment holes. In some embodiments, the first and second joint members can engage together in less than three revolutions, and some can engage in about one revolution. Commonly, the first and second joint members secure the first and second stick portions of a cue stick together.

The present invention also provides a joint for a sports stick having first and second stick portions including a first joint member for securing to the first stick portion. The first joint member includes a coupling rod having a joint securing male threaded region and a centering pin. A second joint member is included for securing to the second stick portion. The second joint member has a cavity for receiving the coupling rod. The receiving cavity includes a joint securing female threaded region and a close fit structure. The male threaded region of the coupling rod engages with the female threaded region of the receiving cavity for securing the first and second joint members together and the centering pin closely engages the close fit structure. The female threaded region is dimensioned with enough clearance relative to the male threaded region and the close fit structure is sufficiently short in length to allow compensation for misalignment.

The present invention additionally provides a joint for a sports stick having first and second stick portions including a first joint member for securing to the first stick portion. The first joint member includes a coupling rod having a joint securing male threaded region and a centering pin. A second joint member is included for securing to the second stick portion. The second joint member has a cavity for receiving the coupling rod. The receiving cavity includes a joint securing female threaded region and a bore region. The male threaded region of the coupling rod engages with the female threaded region of the receiving cavity for securing the first and second joint members together and the centering pin engages the bore region. The centering pin and the bore region closely engage each other along a short axial close engagement length. The female threaded region is dimensioned with enough clearance relative to the male threaded region and the close engagement length is sufficiently short in length to allow compensation for misalignment.

The present invention further includes a method of coupling first and second stick portions of a sports stick together including securing a first joint member to the first stick portion. The first joint member includes a coupling rod having a joint securing male threaded region and a centering pin. A second joint member is secured to the second stick portion. The second joint member has a cavity for receiving the coupling rod. The receiving cavity includes a joint securing female threaded region, a loose fit inner diameter region, and a close fit inner diameter region positioned between the female threaded region and the loose fit inner diameter region. The male threaded region of the coupling rod is engaged with the female threaded region of the receiving cavity for securing the first and second joint members together and the centering pin is closely engaged with the close fit inner diameter region and loosely engaged with the loose fit inner diameter region. The female threaded region and the loose fit inner diameter region are dimensioned with enough clearance relative to the male threaded region and the centering pin of the coupling rod to allow compensation for misalignment.

In the present invention, by allowing pivoting of the coupling rod of the first joint member about the close fit inner diameter region within the receiving cavity of the second joint member, the joint can compensate for axial misalignment of the joint members with their respective stick portions so that the stick portions can still be joined together in axial alignment. This makes it easier for stick portions of sports sticks to be interchangeable. In addition, the joint members can be installed within the stick portions with less precision.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS OF THE INVENTION

Figure 1:
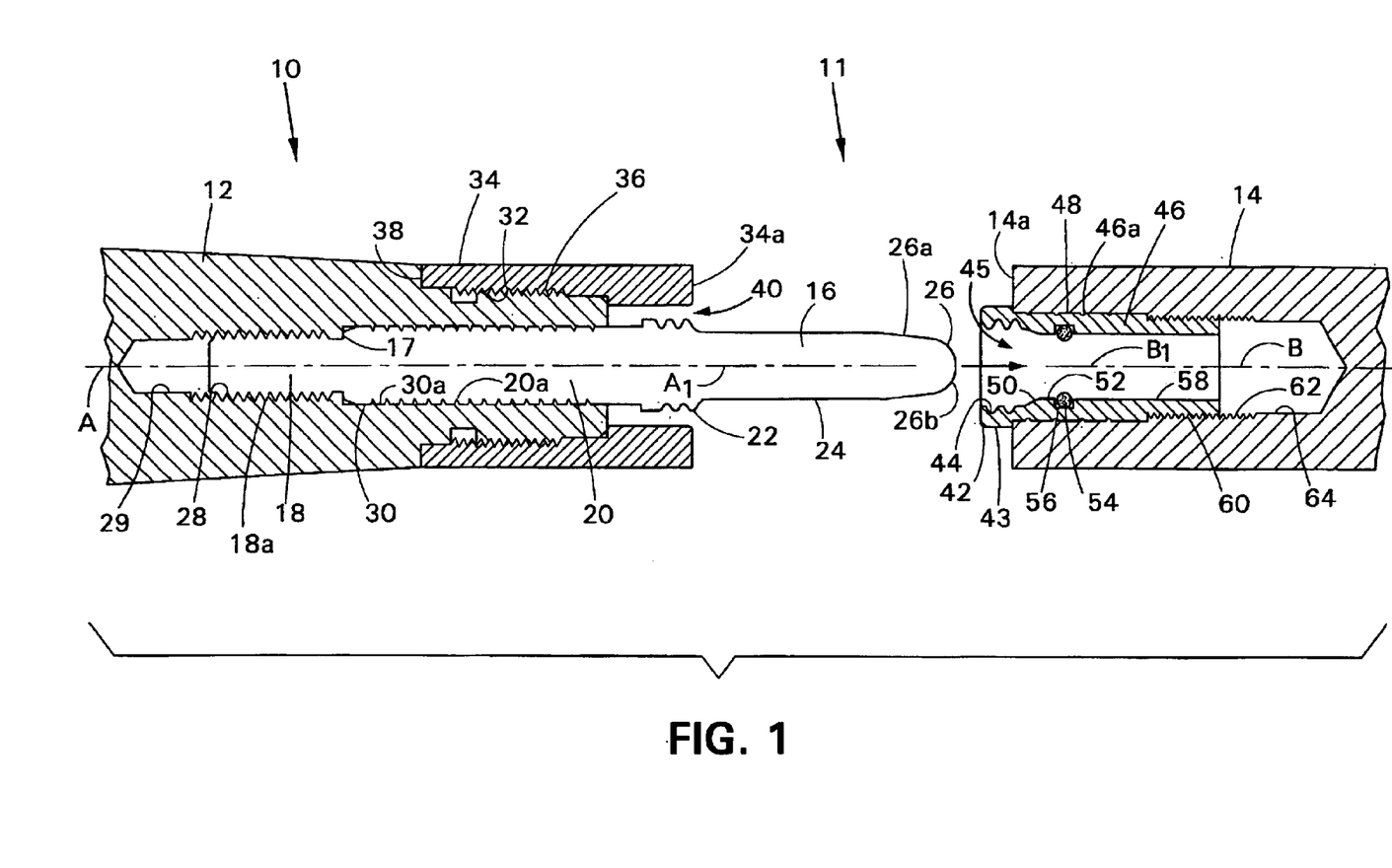
FIG. 1 is a simplified side sectional view of an embodiment of the joint of the present invention in which joint members are secured to respective mating cue stick portions.

FIG. 1 depicts two stick portions 12 and 14 of a sports stick, for example, a cue stick 10, which are coupled together by a joint 11. The cue stick 10 typically includes a first stick portion 12 that forms the butt and a second stick portion 14 that forms the shaft or tip. A coupling rod 16 of a first joint member is secured to the first stick portion 12 and a sleeve 42 forming a second joint member is secured to the second stick portion 14 within a hole 64. The coupling rod 16 includes a centering pin 24 and a joint securing male threaded region 22 which extend from stick portion 12. A collar 34 is secured to the end of stick portion 12 and encircles male threaded region 22 for protecting threaded region 22. Sleeve 42 includes a receiving cavity 45 having a joint securing female threaded region 44, a close fit inner diameter or bore region 52, a grippable insert 54, and a loose fit inner diameter or bore region 58.

The male threaded region 22 of the coupling rod 16 engages the female threaded region 44 of the sleeve 42 for securing stick portion 12 to stick portion 14. The centering pin 24 of the coupling rod 16 closely engages the close fit inner diameter region 52 for aligning the coupling rod 16 with the sleeve 42 and stick portion 14. When the coupling rod 16 and the sleeve 42 are positioned in axial alignment with the respective stick portions 12/14 as shown in FIG. 1, it is apparent that the stick portions 12/14 will be secured together in axial alignment. However, in addition, the loose fit inner diameter region 58 and the female threaded region 44 of sleeve 42 are provided with sufficient clearance relative to the male threaded region 22 and centering pin 24 of coupling rod 16 to allow coupling rod 16 to pivot about the close fit inner diameter region 52 to compensate for any axial misalignment of the coupling rod 16 and sleeve 42 relative to each other or the respective stick portions 12/14 when the stick portions 12/14/ are tightened together. Such compensation allows the stick portions 12/14 to be secured together in axial alignment in cases where the coupling rod 16 and the sleeve 42 are in axial misalignment. The grippable insert 54 grips the centering pin 24 to provide a tighter fit between the centering pin 24 and the receiving cavity 45.

Figure 2:
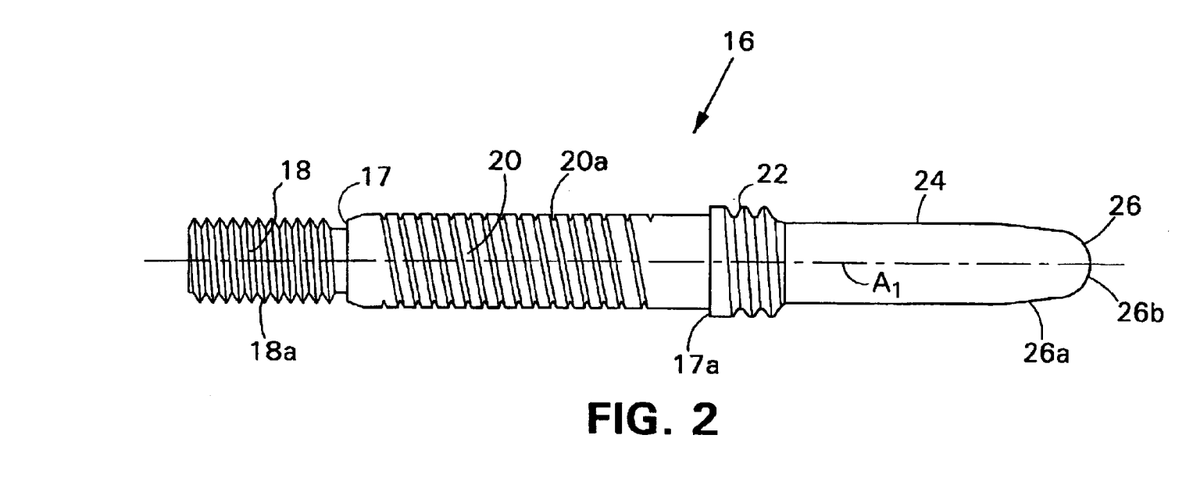
FIG. 2 is a side view of the coupling rod depicted in FIG. 1.

Referring to FIGS. 1 and 2, in one embodiment, the centering pin 24 of coupling rod 16 is located at the distal end of coupling rod 16. The centering pin 24 has an elongate smooth constant diameter and a tip 26 with a slight taper 26a before terminating at a rounded end 26b. Male threaded region 22 is adjacent to the base of centering pin 24 and commonly has a thread pitch and length sufficient to provide engagement with female threaded region 44 in about one turn or revolution. Alternatively, male threaded region 22 can have a thread length that engages in multiple revolutions, however, 7 or less revolutions is generally desirable, with 3 or less revolutions being more preferable. A smooth outer diameter region 20 with a constant diameter is adjacent to male threaded region 22 and has a glue groove 20a formed therein which allows the coupling rod 16 to be glued within a close fitting constant diameter alignment bore 30 at the end of stick portion 12. A secondary male threaded region 18 having threads 18a is adjacent to outer diameter region 20 at the proximal end of coupling rod 16 and separated therefrom by a shoulder 17. Male threaded region 18 engages threaded hole 28 in stick portion 12 to further secure coupling rod 16 in stick portion 12. Collar 34 has a female threaded region 36 which engages a male threaded region 32 on the end of stick portion 12 to secure collar 34 to the end of stick portion 12. Centering pin 24, male threaded region 22, smooth outer diameter region 20, and secondary male threaded region 18 are concentric with and lie along the central axis $A_1$ of coupling rod 16.

Figure 3:
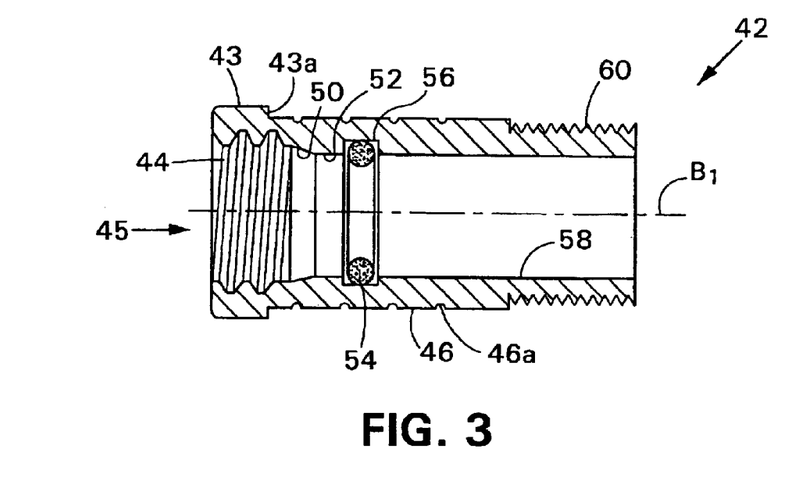
FIG. 3 is a side sectional view of the sleeve depicted in FIG. 1.

Referring to FIGS. 1 and 3, in one embodiment, sleeve 42 has a female threaded region 44 having a length generally corresponding to the length of the male threaded region 22 of coupling rod 16. The major and minor diameters of female threaded region 44 are formed with enough clearance relative to the male threaded region 22, about 0.005 to 0.014 inches, so that the male threaded region 22 can move slightly in the direction laterally or perpendicularly to the central axis $B_1$ of sleeve 42. The close fit inner diameter region 52 has a tapered guide entrance 50 that is adjacent to female threaded region 44 for guiding centering pin 24 into the close fit inner diameter region 52. The close fit inner diameter region 52 is sized relative to the diameter of the centering pin 24 of coupling rod 16 to tightly or closely fit around centering pin 24 with a clearance of about 0.0003 to 0.0009 inches. The close fit inner diameter region 52 is short in axial length in order to allow pivoting of coupling rod 16, typically about 0.020 inches in axial length, although larger or smaller axial lengths can be employed. The close fit inner diameter region 52 and the centering pin 24 closely engage each other along a short axial close engagement length. The grippable insert 54 is adjacent to the close fit inner diameter region 52 for gripping the centering pin 24 of coupling rod 16 and is commonly a resilient compressible polymeric "O" ring about 0.020 to 0.060 inches thick positioned within a radial groove 56. The grippable insert 54 has a short axial length and is positioned adjacent to the close fit inner diameter region 52 so that the combined axial length of the close fit inner diameter region 52 and the grippable insert 54 is sufficiently short to allow pivoting of coupling rod 16. Alternatively, the grippable insert 54 can be rings of other suitable cross sectional geometries and formed of plastic such as rubber, PTFE, delrin, etc., or formed of leather, fabric, etc. The loose fit inner diameter region 58 is adjacent to the grippable insert 54 and is sized to provide enough clearance relative to the centering pin 24 of coupling rod 16, a minimum of about 0.010 inches, to allow movement of centering pin 24 laterally or perpendicularly to the axis $B_1$ of sleeve 42.

The exterior of the proximal end of sleeve 42 includes a male threaded region 60 for engaging a female threaded region 62 within stick portion 14 to secure sleeve 42 thereto. A smooth outer diameter region 46 with a constant diameter is adjacent to male threaded region 60 and has a glue groove 46a formed therein for the entry of glue which allows the sleeve 42 to be glued within a close fitting constant diameter alignment bore 48 at the end of stick portion 14 adjacent to female threaded region 62. The distal end of sleeve 42 includes a head 43 with a shoulder 43a for engaging the face 14a of stick portion 14. The female threaded region 44, tapered guide entrance 50, close fit inner diameter region 52, grippable insert 54, loose fit inner diameter region 58, male threaded region 60, smooth outer diameter region 46 and head 43 are concentric with and lie along the central axis $B_1$ of sleeve 42.

Figure 4:
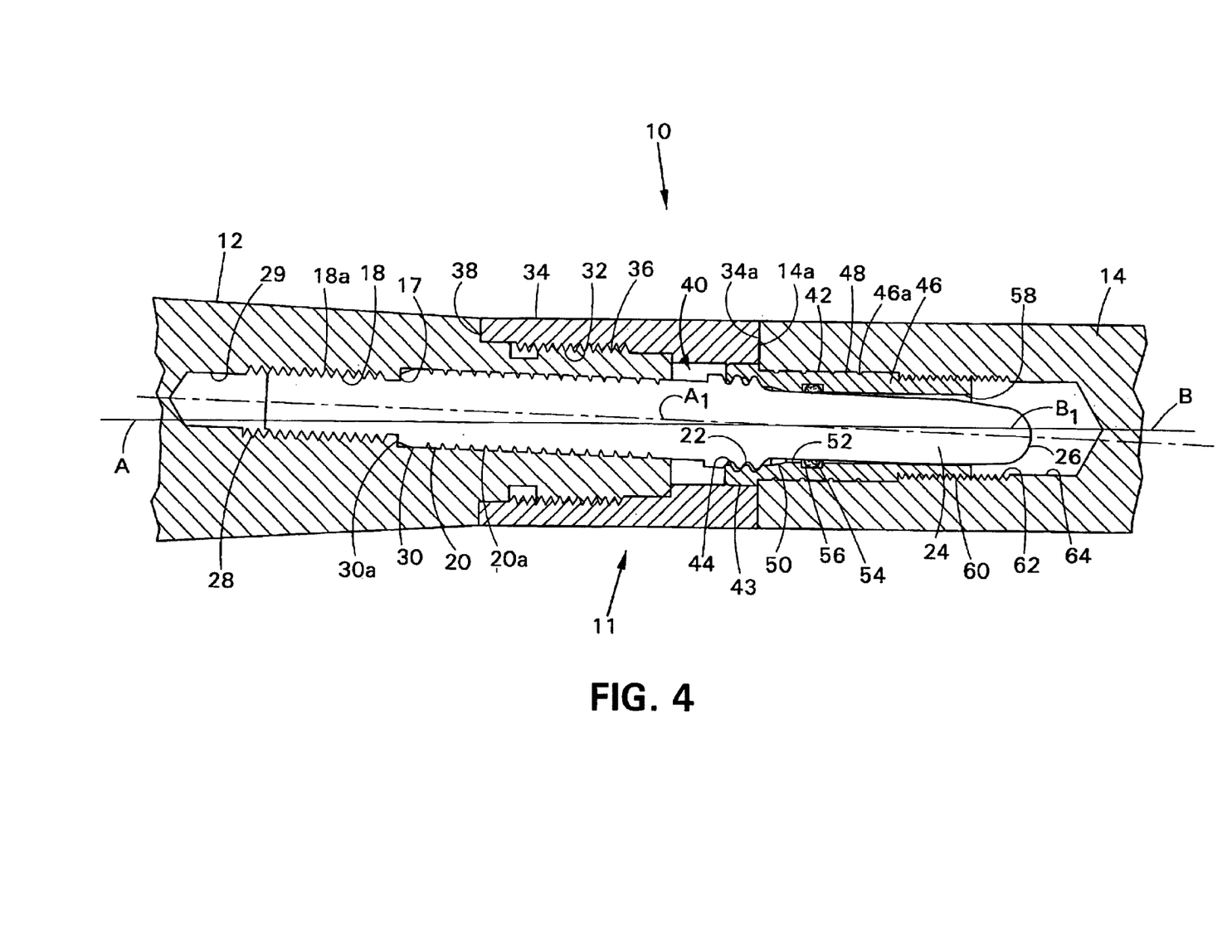
FIG. 4 is a simplified side sectional view of the embodiment of FIG. 1 joined together with one joint member being in misalignment with its corresponding stick portion.

The central axis $A_1$ of coupling rod 16 is preferably aligned on the central axis A of stick portion 12 and the central axis $B_1$ of sleeve 42 is preferably aligned on the central axis B of stick portion 14, as shown in FIG. 1. However, in some cases, one or both of the joint members 16 and/or 42 of joint 11 can be secured to the stick portions 12 and/or 14 in a manner where the central axis of the joint members $A_1$ and/or $B_1$ does not lie along the central axis A and/or B of the corresponding stick portions 12 and/or 14. FIG. 4 depicts a situation where coupling rod 16 is secured within stick portion 12 in a misaligned manner so that the central axis $A_1$ of coupling rod 16 is at an angle relative to the central axis A of stick portion 12. Sleeve 42 is shown positioned within stick portion 14 in a manner where the central axis $B_1$ of sleeve 42 is aligned with the central axis B of stick portion 14 in order to simplify FIG. 4 for viewing clarity.

When engaging stick portions 12/14 as shown in FIG. 4 where at least one joint member is misaligned with the respective stick portion 12/14, centering pin 24 of coupling rod 16 is inserted into receiving cavity 45 (FIG. 3) of sleeve 42, through female threaded region 44. The tip 26 of centering pin 24 is guided by the inwardly angled or tapered guide entrance 50 into the close fit inner diameter region 52. The tip 26 of centering pin 24 passes through the grippable insert 54, through the loose fit inner diameter region 58 and into hole 64 within stick portion 14. The grippable insert 54 frictionally and resiliently grips the centering pin 24 of coupling rod 16 in a firm manner. In addition, as the centering pin 24 frictionally slides through the grippable insert 54, contaminants, dirt, particles, etc., are wiped or cleaned from the surfaces of the centering pin 24 by the grippable insert 54. The close fit inner diameter region 52 centers the centering pin 24 of coupling rod 16 relative to sleeve 42. The stick portions 12 and 14 are then rotated relative to each other so that the male threaded region 22 of coupling rod 16 engages the female threaded region 44 of sleeve 42. When initially engaging, the stick portions 12/14 may be axially misaligned. Although the coupling rod 16 is shown axially misaligned with the central axis A of stick portion 12, the female threaded region 44 and the loose fit inner diameter region 58 of sleeve 42 are made with enough clearance relative to the male threaded region 22 and centering tip 24 of coupling rod 16 so that when the face 39a of collar 34 on stick portion 12 engages the face 14a of stick portion 14, the coupling rod 16 has sufficient room to pivot within sleeve 42 about the close fit inner diameter region 52 to compensate for the misalignment. As a result, the faces 39a and 14a of stick portions 12/14 are allowed to come together when the stick portions 12/14 are tightened so that the central axis A of stick portion 12 is aligned with the central axis B of stick portion 14. If the coupling rod 16 was not able to pivot, the faces 39a and 14a of the stick portions 12/14 would not completely come together and the central axes A/B of stick portions 12/14 would remain misaligned.

The tapered portion of tip 26 of centering pin 24 may provide an increased amount of pivoting to occur by allowing centering pin 24 to pivot at a greater angle within the loose fit inner diameter region 58. Although the coupling rod 16 is allowed to pivot within sleeve 42 until the stick portions 12/14/are tightened together, the grippable insert 54 tightly or firmly grips the centering pin 24 in a frictional manner so that the user of the cue stick 10 is provided with the feel of a tight fit. It is understood that both the coupling rod 16 and the sleeve 42 can be misaligned with the stick portions 12/14, or only the coupling rod 16 as shown, or sleeve 42.

When installing joint 11 within cue stick 10, the coupling rod 16 and sleeve 42 do not need to be installed in the same operation at the same time in order to ensure proper alignment due to the increased tolerance for misalignment. As a result, the stick portions 12/14 can be interchangeable with the stick portions 12 or 14 of other cue sticks 10. Typically, when installing coupling rod 16 within stick portion 12, a hole 29 is drilled into stick portion 12. A bottom portion is threaded to form threaded hole 28. The top portion is bored out to form alignment bore 30. The diameter of the end of stick portion 12 is turned down and provided with a male threaded region 32 and a shoulder 38. Glue is applied to the smooth outer diameter region 20 of coupling rod 16 and enters the glue groove 20a. The secondary male threaded region 18 of coupling rod 16 is then rotationally engaged within the threaded hole 28 until the shoulder 17 of coupling rod 16 engages or bottoms out against the shoulder 30a of alignment bore 30, or shoulder 17a bottoms out against stick portion 12. Alignment bore 30 aligns coupling rod 16 relative to stick portion 12, preferably along the central axis A of stick portion 12, and the glue adhesively secures the coupling rod 16 therein. The female threaded region 36 of collar 34 is rotationally engaged with the male threaded region 32 of stick portion 12 until engaging shoulder 38. If desired, glue can be employed. The collar 34 encircles male threaded region 22 of coupling rod 16 with an annular cavity 40 therebetween.

Typically, when installing sleeve 42 within stick portion 14, hole 64 is drilled within stick portion 14. Hole 64 is made sufficiently deep to later accept the tip 26 of coupling rod 16 therein. Female threaded region 62 is formed within hole 64 and alignment bore 48 is formed in the end of stick portion 14. Glue is applied to the smooth outer diameter region 46 of sleeve 42 and enters into the glue groove 46a. The male threaded region 60 of sleeve 42 is rotationally engaged within female threaded region 62 until the shoulder 43a (FIG. 3) of head 43 engages against the face 14a of stick portion 14. Alignment bore 48 aligns sleeve 42 relative to stick portion 14, preferably along the central axis B of stick portion 14, and the glue adhesively secures the sleeve 42 therein.

Although coupling rod 16 is shown to be secured to the stick portion 12 that typically forms the butt of cue stick 10 and sleeve 42 is shown to be secured to the stick portion 14 that typically forms the tip, alternatively, the positions or locations of the coupling rod 16 and sleeve 42 can be reversed. In addition, the cue stick 10 can have more than two stick portions, and therefore, can have more than one joint 11. Although the present invention sports stick has been shown as a cue stick 10, other embodiments of sports sticks include golf clubs as well as any other sports stick that one can make in multiple assemble-able pieces. Other embodiments of the present invention include non sports applications such as poles for tents, sticks for paint rollers, etc. In FIGS. 1–4, coupling rod 16 has been shown with an elongate centering pin 24 at the distal end and the male threaded region 22 adjacent thereto, with the sleeve 42 having the loose fit inner diameter region 58 at the proximal end of sleeve 42 and the female threaded region 44 at the distal end. Alternatively, the position of the threaded regions 22/44 can be reversed with the centering pin 24 and loose fit inner diameter region 58. In such a situation, the diameters would be arranged to provide a suitable configuration. Furthermore, in some embodiments, the grippable insert 54 can be positioned on the centering pin 24 of the coupling rod 16 instead of within sleeve 42. In some cases, the sleeve 42 can be replaced by two or more components which provide the functions of sleeve 42, such as the female threaded, the tapered guide entrance, the close fit inner diameter region, the grippable insert, and the loose fit inner diameter region. The components can be assembled together or assembled separately within stick portion 14.

Some of the features of the coupling rod 16 and sleeve 42 depicted in the drawings can be omitted, for instance, the grippable insert 54 or, in some cases, the loose fit inner diameter region 58. When the loose fit inner diameter region 58 of sleeve 42 is omitted, the hole 64 within stick portion 14 can be shaped and dimensioned to act as the loose fit inner diameter region. Other features of sleeve 42 can be also directly formed within stick portion 14 such as the female threaded region 44 or the close fit inner diameter region 52. In addition, in some situations, the close fit inner diameter region 52 can be omitted with the grippable insert 54 functioning as a close fit structure for centering and pivoting coupling rod 16. Therefore, a close fit structure for centering and pivoting a coupling rod can comprise either a close fit inner diameter region, a grippable insert, or the combination of the two together. It is understood that the dimensions of the joint 11 can vary depending upon the application at hand. Although the close fit inner diameter region 52 is shown to have a constant diameter and tapered guide entrance 50 is shown to be angled, alternatively, one or both can have curved surfaces.

Figure 5:
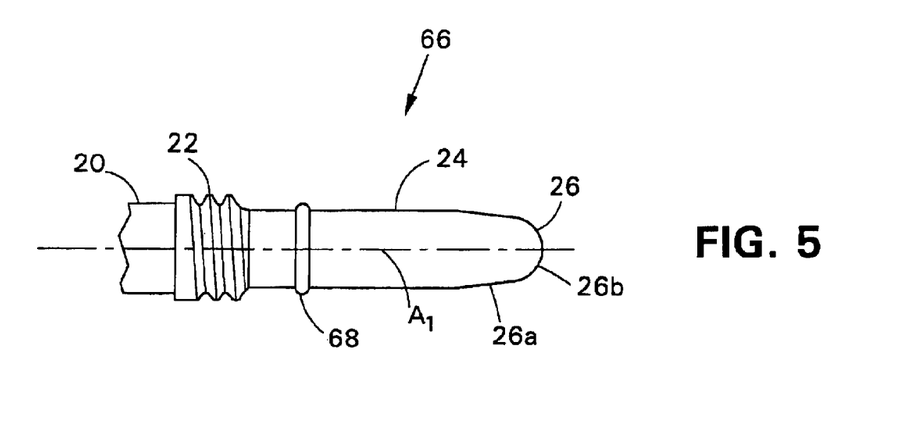
FIG. 5 is a side view of a portion of another embodiment of a coupling rod.

Referring to FIG. 5, coupling rod 66 differs from coupling rod 16 in that the centering pin 24 of coupling rod 66 is formed with a larger diameter portion 68 having a short axial length. As a result, the larger diameter portion 68 forms a protruding annular ring encircling or extending about the circumference of centering pin 24. The larger diameter portion 68 is typically rounded as shown. Coupling rod 66 engages a mating sleeve which differs from sleeve 42 in that the tapered guide entrance 50 and close fit inner diameter region 52 are omitted. The larger diameter portion 68 is dimensioned to engage the inner diameter or bore region 58 of such a sleeve with a close fit so that the coupling rod 66 is centered. The short axial length of the larger diameter portion 68 allows pivoting of the coupling rod 66 to compensate for misalignment. The larger diameter portion 68 and the inner diameter region 58 engage each other along a short axial close engagement length. The grippable insert 54 is typically positioned within the mating sleeve, but in some cases can be secured to the centering pin 24 of coupling rod 66.

Figure 6:
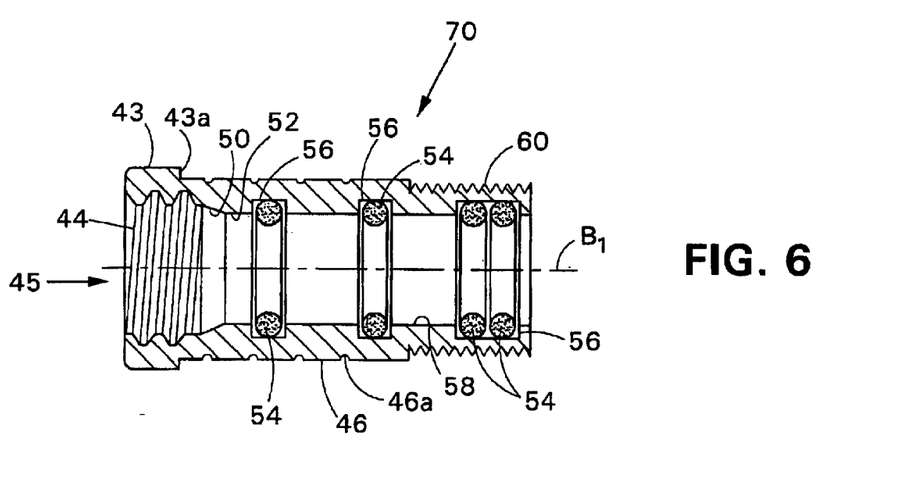
FIG. 6 is a side sectional view of another embodiment of a sleeve.

Referring to FIG. 6, sleeve 70 is another embodiment of a sleeve in the present invention for engagement with coupling rod 16, which differs from sleeve 42 in that sleeve 70 includes more than one grippable insert 54 positioned within receiving cavity 45. The positioning of multiple grippable inserts 54 within receiving cavity 45 can provide increased stability for the centering pin 24 of coupling rod 16 when inserted therein, while at the same time allowing compensation for misalignment. Sleeve 70 is shown in FIG. 6 to include a grippable insert 54 positioned within a radial groove 56 at a first location adjacent to the close fit inner diameter region 52, a grippable insert 54 positioned in a groove 56 at a second location midway along the loose fit inner diameter region 58, and two grippable inserts 54 positioned in a groove 56 at a third location at the end of the loose fit inner diameter region 58. Although such a configuration of grippable inserts 54 has been shown, it is understood that the grippable inserts 54 can be arranged in a number of different combinations. For example, side by side grippable inserts 54 can be positioned at the first and second locations. In addition, in some cases, multiple grippable inserts 54 can be positioned adjacent to the close fit inner diameter region 52 and no grippable inserts 54 located anywhere else. Furthermore, it may be desirable to have one grippable insert 54 located adjacent to the close fit inner diameter region 52 and one grippable insert 54 positioned apart therefrom near the end of the loose fit inner diameter region 58, or at intermediate locations. Also a single grippable insert 54 can be positioned in receiving cavity 45 near the end of the loose fit inner diameter region 58 or at intermediate locations.

Figure 7:
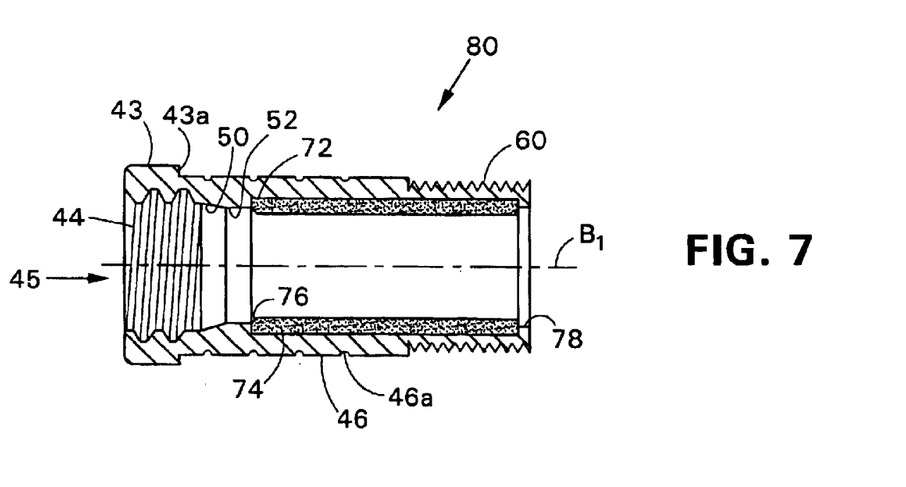
FIG. 7 is a side sectional view of yet another embodiment of a sleeve.

Referring to FIG. 7, sleeve 80 is yet another embodiment of a sleeve in the present invention for engagement with coupling rod 16, which differs from sleeve 42 in that sleeve 80 includes a resilient compressible grippable insert sleeve 74 positioned within diameter 72 adjacent to close fit inner diameter region 52 and extending near the end of receiving cavity 45. The grippable insert sleeve 74 can be retained within diameter 72 by a lip 78 and is formed of resilient material, such as rubber, for frictionally and resiliently gripping the centering pin 24 of the coupling rod 16 while at the same time having enough give to allow for misalignment. The entrance 76 to grippable insert sleeve 74 is tapered for easier insertion of centering pin 24. It is understood that the length of the grippable insert sleeve 74 can be varied to provide different levels of stability and can be retained within diameter 72 with glue in addition to lip 78, or alternatively, instead of lip 78. In such cases, where the length of grippable insert sleeve 74 is shorter than that shown in FIG. 7, sleeve 74 can be positioned at a variety of locations relative to close fit inner diameter region 52, for example adjacent to the close fit inner diameter region 52, at the far end of receiving cavity 45, or positions intermediate thereof. Grippable insert sleeve 74 can also be formed of polymers other than rubber, such as polytetrafluoroethylene (PTFE) and other plastics, UHMW, etc. In some cases, the polymer material can be foamed. Non-polymer materials can also be employed such as leather, woven and non-woven fabric materials, etc.

While this invention has been particularly shown and described with references to preferred embodiments thereof, it will be understood by those skilled in the art that various changes in form and details may be made therein without departing from the scope of the invention encompassed by the appended claims. For example, various features of the embodiments described above can be omitted or combined together.

What is claimed is:

1. A joint for a sports stick having first and second stick portions comprising:
    a first joint member for securing to the first stick portion, the first joint member including a coupling rod having a joint securing male threaded region and a centering pin; and
    a second joint member for securing to the second stick portion, the second joint member having a cavity for receiving the coupling rod, the receiving cavity including a joint securing female threaded region, a loose fit inner diameter region, and a close fit inner diameter region positioned between the female threaded region and the loose fit inner diameter region, the male threaded region of the coupling rod being engageable with the female threaded region of the receiving cavity for securing the first and second joint members together and the centering pin being closely engageable with the close fit inner diameter region, the female threaded region and the loose fit inner diameter region being dimensioned with enough clearance relative to the male threaded region and the centering pin of the coupling rod to allow compensation for misalignment.

2. The joint of claim 1 further comprising a grippable insert positioned within the receiving cavity of the second joint member adjacent to the close fit inner diameter region for gripping the centering pin of the fast joint member.

3. The joint of claim 2 in which the grippable insert is compressible.

4. The joint of claim 2 in which the grippable insert is an "O" ring.

5. The joint of claim 2 in which the close fit inner diameter region has a tapered entrance.

6. The joint of claim 1 in which said clearance allows the coupling rod to pivot about the close fit inner diameter region.

7. The joint of claim 1 in which the first and second joint member are for securing the first and second stick portions of a cue stick together.

8. The joint of claim 7 in which the first and second joint members engage together in less than three revolutions.

9. The joint of claim 8 in which the first and second joint members engage together in about one revolution.

10. The joint of claim 7 in which the first and second joint members include secondary male threaded regions for securing the first and second joint members to the first and second stick portions.

11. The joint of claim 10 in which the first and second joint members each include a smooth outer diameter region adjacent to the secondary male threaded region.

12. The joint of claim 11 in which the smooth outer diameter regions each include a glue groove.

13. The joint of claim 7 in which the first joint member further comprises a collar encircling the joint securing male threaded region of the coupling rod for protecting said threaded region.

14. A sports stick comprising:
    a first stick portion having a first joint member secured thereto, the first joint member including a coupling rod having a joint securing male threaded region and a centering pin; and
    a second stick portion having a second joint member secured thereto, the second joint member having a cavity for receiving the coupling rod, the receiving cavity including a joint securing female threaded region, a loose fit inner diameter region, and a close fit inner diameter region positioned between the female threaded region and the loose fit inner diameter region, the male threaded region of the coupling rod being engageable with the female threaded region of the receiving cavity for securing the first and second joint members together and the center pin being closely engageable with the close fit inner diameter region, the female threaded region and the loose fit inner diameter region being dimensioned with enough clearance relative to the male threaded region and the centering pin of the coupling rod to allow compensation for misalignment.

15. The sports stick of claim 14 further comprising a grippable insert positioned within the receiving cavity of the second joint member adjacent to the close fit inner diameter region for gripping the centering pin of the first joint member.

16. The sports stick of claim 15 in which the grippable insert is compressible.

17. The sports stick of claim 15 in which the grippable insert is an "O" ring.

18. The sports stick of claim 15 in which the close fit inner diameter region has a tapered entrance.

19. The sports stick of claim 14 in which said clearance allows the coupling rod to pivot about the close fit inner diameter region.

20. The sports stick of claim 14 in which the first and second stick portions of the sports stick are first and second stick portions of a cue stick.

21. The sports stick of claim 20 in which the first and second joint members engage together in less than three revolutions.

22. The sports stick of claim 21 in which the first and second joint members engage together in about one revolution.

23. The sports stick of claim 20 in which the first and second joint members include secondary male threaded regions for securing the first and second joint members to the first and second stick portions.

24. The sports stick of claim 23 in which the first and second joint members each include a smooth outer diameter region adjacent to the secondary male threaded region.

25. The sports slick of claim 24 in which the smooth outer diameter regions each include a glue grove.

26. The sports stick of claim 20 in which the first joint member further comprises a collar encircling the joint securing male threaded region of the coupling rod for protecting said threaded region.

27. A joint for a cue stick having first and second stick portions comprising:
    a first joint member for securing to the fist stick portion, the first joint member including a coupling rod having a joint securing male threaded region and a centering pin; and a second joint member for securing to the second stick portion, the second joint member having a cavity for receiving the coupling rod, the receiving cavity including a joint securing female threaded region, a loose fit inner diameter region, and a close fit inner diameter region positioned between the female threaded region and the loose fit inner diameter region, the male threaded region of the coupling rod being engageable with the female threaded region of the receiving cavity for securing the first and second joint members together and the centering pin being closely engageable with the close fit inner diameter region, the female threaded region and the loose fit inner diameter region being dimensioned with enough clearance relative to the male threaded region and the centering pin of the coupling rod to allow pivoting of the coupling rod about the close fit inner diameter region to compensate for misalignment, a grippable insert being positioned within the receiving cavity of the second joint member adjacent to the close fit inner diameter region for gripping the centering pin of the first joint member.

28. A cue stick comprising:
a first stick portion having a first joint member secured thereto, the fist joint member including a coupling rod having a joint securing male threaded region and a centering pin; and
a second stick portion having a second joint member secured thereto, the second joint member having a cavity for receiving the coupling rod, the receiving cavity including a joint securing female threaded region, a loose fit inner diameter region, and a close fit inner diameter region positioned between the female threaded region and the loose fit inner diameter region, the male threaded region of the coupling rod being engageable with the female threaded region of the receiving cavity for securing the first and second joint member together and the centering pin being closely engageable with the close fit inner diameter region, the female threaded region and the loose fit inner diameter region being dimensioned with enough clearance relative to the male threaded region and the centering pin of the coupling rod to allow pivoting of the coupling rod about the close fit inner diameter region to compensate for misalignment, a grippable insert being positioned within the receiving cavity of the second joint member adjacent to the close fit inner diameter region for gripping the centering pin of the first joint member.

29. A joint for a sports stick having first and second stick portions comprising:
a first joint member for securing to the first stick portion, the first joint member including a coupling rod having a joint securing male threaded region and a centering pin; and
a second joint member for securing to the second stick portion, the second joint member having a cavity for receiving the coupling rod, the receiving cavity including a joint securing female threaded region, a loose fit inner diameter region, and a close fit structure comprising a close fit inner diameter region positioned between the female threaded region and the loose fit inner diameter region, the male threaded region of the coupling rod being engageable with the female threaded region of the receiving cavity for securing the first and second joint members together and the centering pin being closely engageable with the close fit structure, the female threaded region being dimensioned with enough clearance relative to the male threaded region and the close fit structure being sufficiently short in length to allow compensation for misalignment, the loose fit inner diameter region being dimensioned with enough clearance relative to the centering pin of the coupling rod to allow pivoting of the coupling rod.

30. The joint of claim 29 further comprising a grippable insert positioned within the receiving cavity of the second joint member adjacent to the close fit inner diameter region for gripping the center pin of the first joint member.

31. A method of forming a joint for coupling first and second stick portions of a sports stick together comprising:
forming a first joint member for securing to the first stick portion, the first joint member including a coupling rod having a joint securing male threaded region and a centering pin; and
forming a second joint member for securing to the second stick portion, the second joint member having a cavity for receiving the coupling rod, the receiving cavity including a joint securing female threaded region, a loose fit inner diameter region, and a close fit inner diameter region positioned between the female threaded region and the loose fit inner diameter region, the male threaded region of the coupling rod being engageable with the female threaded region of the receiving cavity for securing the first and second joint members together and the centering pin being closely engageable with the close fit inner diameter region, the female threaded region and the loose fit inner diameter region being dimensioned with enough clearance relative to the male threaded region and the centering pin of the coupling rod to allow compensation for misalignment.

32. The method of claim 31 further comprising positioning a grippable insert within the receiving, cavity of the second joint member adjacent to the close fit inner diameter region for gripping the centering pin of the first joint member.

33. The method of claim 32 further comprising forming the grippable insert from material that is compressible.

34. The method of claim 32 further comprising forming the grippable insert from an "O" ring.

35. The method of claim 31 further comprising forming the close fit inner diameter region with a tapered entrance.

36. The method of claim 31 further comprising forming said clearance to allow the coupling rod to pivot about the close fit inner diameter region.

37. The method of claim 31 further comprising forming the first and second joint members for securing the first and second stick portions of a cue stick together.

38. The method of claim 37 further comprising forming the first and second joint members to engage together in less than three revolutions.

39. The method of claim 38 further comprising forming the first and second joint members to engage together in about one revolution.

40. The method of claim 37 further comprising forming the first and second joint members with secondary male threaded regions for securing the fist and second joint members to the first and second stick portions.

41. The method of claim 43 further comprising forming the first and second joint members to each include a smooth outer diameter region adjacent to the secondary male threaded region.

42. The method of claim 41 further comprising forming each smooth outer diameter region with a glue groove.

43. The method of claim 37 further comprising encircling the male threaded region of the coupling rod with a collar for protecting said threaded region.

44. A method of forming a joint for coupling first and second stick portions of a sports stick together comprising:
- forming a first joint member for securing to the first stick portion, the first joint member including a coupling rod having a joint securing male threaded region and a centering pin; and
- forming a second joint member for securing to the second stick portion, the second joint member having a cavity for receiving the coupling rod, the receiving cavity including a joint securing female threaded region, a loose fit inner diameter region, and a close fit structure comprising a close fit inner diameter region positioned between the female threaded region and the loose fit inner diameter region, the male threaded region of the coupling rod being engageable with the female threaded region of the receiving cavity for securing the first and second joint members together and the centering pin being closely engageable with the close fit structure, the female threaded region being dimensioned with enough clearance relative to the male threaded region and the close fit structure being sufficiently short in length to allow compensation for misalignment, the loose fit inner diameter region being dimensioned with enough clearance relative to the centering pin of the coupling rod to allow pivoting of the coupling rod.

45. A method of coupling first and second stick portions of a sports stick together comprising:
- securing a first joint member to the first stick portion, the first joint member including a coupling rod having a joint securing male threaded region and a centering pin;
- securing to a second joint member the second stick portion, the second joint member having a cavity for receiving the coupling rod, the receiving cavity including a joint securing female threaded region, a loose fit inner diameter region, and a close fit inner diameter region positioned between the female threaded region and the loose fit inner diameter region; and
- engaging the male threaded region of the coupling rod with the female threaded region of the receiving cavity for securing the first and second joint members together while closely engaging the centering pin with the close fit inner diameter region and loosely engaging the centering pin with the loose fit inner diameter region, the female threaded region and the loose fit inner diameter region being dimensioned with enough clearance relative to the male threaded region and the centering pin of the coupling rod to allow compensation for misalignment.

* * * * *

UNITED STATES PATENT AND TRADEMARK OFFICE
CERTIFICATE OF CORRECTION

PATENT NO.     : 6,783,462 B1
DATED          : August 31, 2004
INVENTOR(S)    : Paul Costain It is certified that error appears in the above-identified patent and that said Letters Patent is hereby corrected as shown below:

Column 10,
Line 20, delete "center" and insert -- centering --;
Line 56, delete "slick" and insert -- stick --;
Line 64, delete "fist" and insert -- first --.

Column 11,
Line 24, delete "fist" and insert -- first --.
Line 37, delete "member" and insert -- members --.

Column 12,
Line 11, delete "center" and insert -- centering --;
Line 36, delete the comma "," after "receiving";
Line 60, delete "fist" and insert -- first --.

Signed and Sealed this

Seventh Day of December, 2004

JON W. DUDAS
*Director of the United States Patent and Trademark Office*